(No Model.)
G. D. FOOTE.
BICYCLE.
No. 291,323. Patented Jan. 1, 1884.
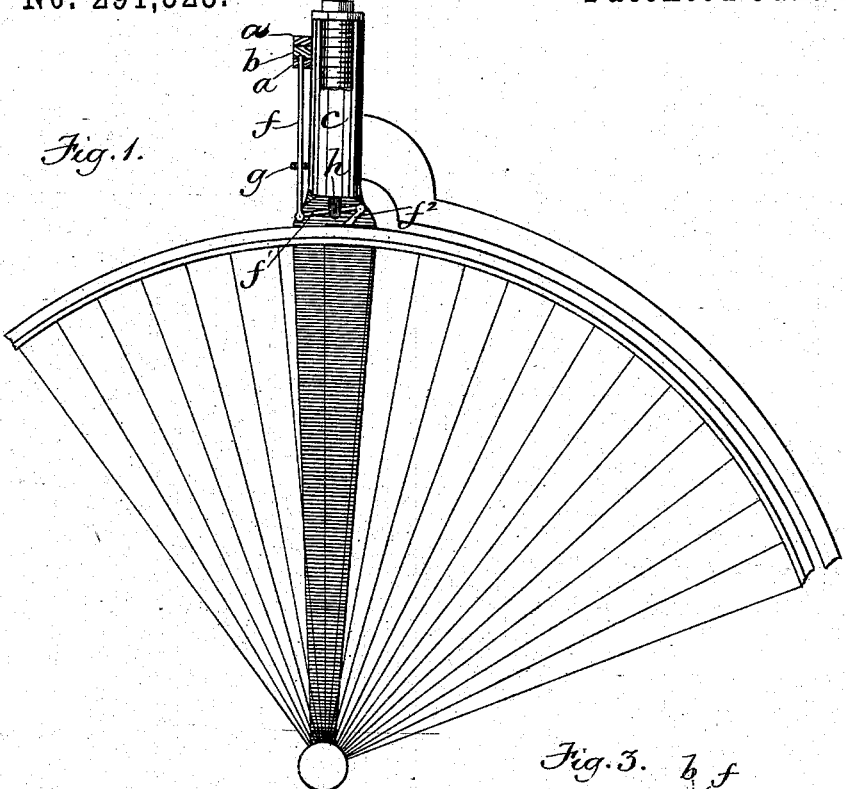
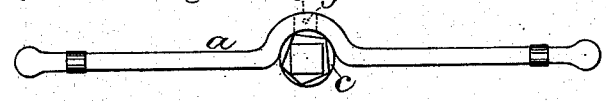
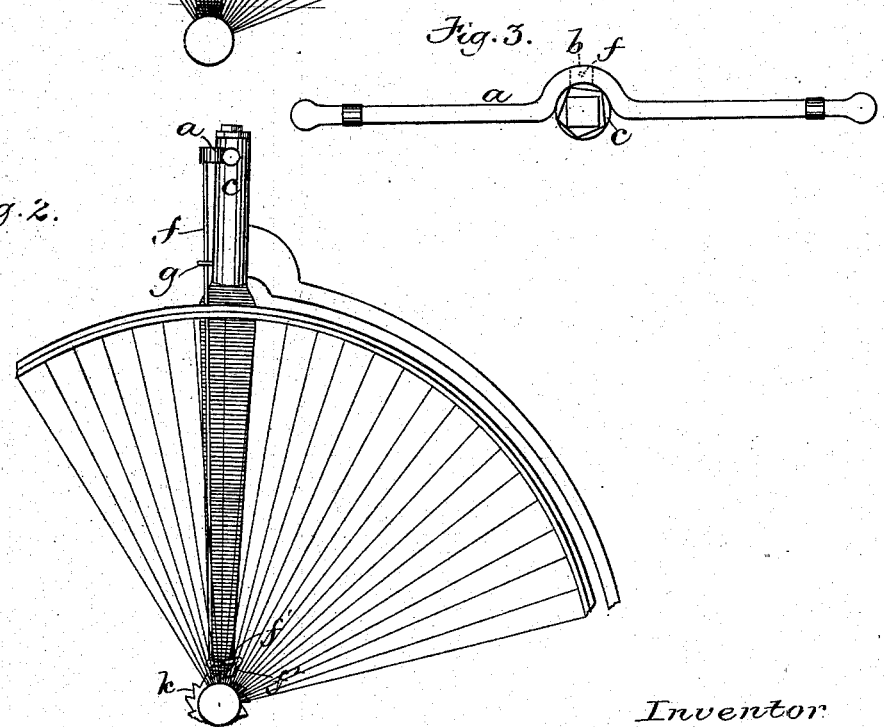
Witnesses.
Inventor

UNITED STATES PATENT OFFICE.

GEORGE D. FOOTE, OF PITTSFIELD, MASSACHUSETTS.

BICYCLE.

SPECIFICATION forming part of Letters Patent No. 291,828, dated January 1, 1884.

Application filed November 15, 1883. (No model.)

*To all whom it may concern:*

Be it known that I, GEORGE D. FOOTE, of Pittsfield, in the county of Berkshire and State of Massachusetts, have invented certain Improvements in Bicycles, of which the following is a specification.

This invention has for its object to provide an improved handle-detaching device for bicycles, whereby the rider is enabled to prevent himself from falling head first from the bicycle when the large wheel strikes an obstruction which is too large to allow the bicycle to pass over it, or when it is moving at a very rapid speed and strikes a smaller obstruction, or under any circumstances which would tend to throw the rider forward.

In bicycles as commonly made the handle-bars are rigidly attached to the machine, and when the rider is thrown forward his legs are held by the handle-bars, which causes the rider to fall forward head foremost and the machine to fall upon him.

This invention consists in the provision of means for instantly detaching the handle-bars from the head as soon as the large wheel is retarded or stopped, and the fork and small wheel rise, causing a reverse motion of the whole moving parts.

The invention also consists in certain details, all of which I will now proceed to describe and claim.

Of the accompanying drawings, forming a part of this specification, Figure 1 represents a side elevation of a bicycle having the near half of the fork broken away and showing my improvement. Fig. 2 represents a side elevation of a modification of the same. Fig. 3 represents a top view of the handles, with the fastening in dotted lines.

The same letters of reference indicate the same parts in all the figures.

In the drawings, $a$ represents the handle-bar of a bicycle.

$b$ represents a projection in the front side of the head $c$, on which the handle-bar fits. Said handle-bar $a$ is provided with a slot to receive the projection $b$, and is formed to bear only against the front of the head, so that it may be removed by pressure from the rear.

$f$ is a rod or bolt which normally passes through the lower portion of the handle-bar and enters the projection $b$. Said rod slides in a guide, $g$, on the head $c$, and is connected at its lower end to a lever, $f'$, which is pivoted at $h$ to a suitable projection on the head, and extends backwardly between the forks in which the wheel is journaled.

To the rear end of the lever $f'$ is pivoted a dog, $f^2$, which is inclined forward, and bears, preferably, on the tire of the large wheel. The handle-bar $a$ is secured by the bolt $f$ to the head with sufficient firmness to prevent the handle-bar from becoming detached in ordinary riding.

The operation of my improvement is as follows: When the machine, running in the ordinary manner, suddenly strikes an obstruction sufficiently large to throw the rider, the first motion made by the rider and the forks and backbone of the machine is forward toward the ground. This motion causes the dog $f^2$ to catch the tire, and thus incline the lever $f'$ so as to withdraw the bolt $f$ from the handle, and thus loosen the latter, so that it will easily yield and be detached from the head by the pressure exerted upon it by the rider's legs as he is thrown forward. The rider is thus prevented from being thrown head first, or from "taking a header," and is enabled to land upon his feet.

In Fig. 2 I have shown a modification of my invention, in which a ratchet-wheel, $k$, on the axle of the machine gives the required action to the dog $f^2$, lever $f'$, and bolt $f$. In this case the bolt $f$ is lengthened so as to be carried to the ratchet-wheel, which is rigidly attached to and rotates with the large wheel. In the present instance the rod $f$ is shown as passing down the right side of the wheel, and between said wheel and the right fork, the other being broken away to show the construction and operation. The construction first described, and shown in Fig. 1, is preferred, however, on account of its effectiveness and simplicity, the action of the rod $f$, as will readily be seen, being necessarily much quicker when engaging with the tire than with the ratchet near the center of the large wheel.

It will be seen that by my device all danger from "headers" is obviated.

I am aware that it is not new to make the handle-bar detachable by an upward movement, the bar being placed upon the head without positive connection thereto.

I am also aware that the handle-bar has been jointed or hinged to the head, so that its arms will swing forward when pressed against from the rear. I do not therefore claim a detachable or yielding handle-bar.

I claim—

1. In a bicycle, the combination of the head, the handle-bar applied to the front side of the head, a locking device or bolt normally securing the handle to the head, and means for automatically retracting said bolt, as set forth.

2. The combination of the head having a projection, $b$, the handle-bar formed to bear only against the front side of said head, and slotted to receive the projection $b$, the locking-bolt $f$, normally connecting said handle-bar and projection, and the pivoted lever $f'$ and dog $f^2$, adapted to be operated by the wheel, or its equivalent, to retract the bolt $f$, as set forth.

In testimony whereof I have signed my name to this specification, in the presence of two subscribing witnesses, this 9th day of November, 1883.

GEORGE D. FOOTE.

Witnesses:
 HENRY M. PITTS,
 E. T. SLOCUM.